Patented Aug. 21, 1951

2,565,347

UNITED STATES PATENT OFFICE 2,565,347

STABILIZATION OF PYROPHORIC METAL CATALYSTS UNDER FLUIDIZED CONDITIONS

John George Mackay Bremner and Stanley Beaumont, Norton-on-Tees, England, assignors to Imperial Chemical Industries Limited, a corporation of Great Britain No Drawing. Application February 13, 1947, Serial No. 728,387. In Great Britain February 27, 1946

4 Claims. (Cl. 252—461)

This invention relates to the preparation of catalysts and in particular to catalysts which are subjected to treatment with a reducing agent before use.

In the preparation of catalysts it has already been proposed to subject reducible metal compounds, for example metal oxides, hydroxides, and carbonataes, or mixtures containing such metal compounds, to treatment with a gaseous or vaporous reducing agent, for example hydrogen, to produce a catalyst containing a meal in the elementary state or in a lower state of oxidation than before treatment. In such treatment it has been customary to pass the reducing agent over or through a bed of the material contained in a suitable vessel such as a tube, which, if desired, was provided with a mechanically operated stirrer or which was vibrated by suitable means, the material being in the form of pellets or as a powder. With these prior proposals it has been difficult to maintain the temperature in the reduction vessel within chosen limits and it has been difficult or even impossible to obtain a uniformly reduced product, and to obtain successive batches of reduced catalyst having substantially the same catalytic activity.

The production of catalysts by reduction processes as hereinbefore described may result in the metal or metals being present in the pyrophoric state in the reduced catalyst, which if allowed to come freely into contact with an oxygen-containing gas, is liable to undergo a far-reaching and highly exothermic oxidation, with consequent loss of catalytic activity. It is already known to stabilise catalysts containing metals in the elementary state by cautious treatment with an oxidising agent whereby a catalyst is obtained which may be handled without special precautions being necessary to prevent its coming freely into contact with oxygen-containing gases, such as air. This stabilisation treatment, which effects a superficial oxidation, is without serious effect on the activity of the catalyst.

The present invention provides an improved process for the preparation of catalysts which comprises subjecting the catalyst in particulate form and at elevated temperature to the step of treatment with a reducing agent and/or, when in the reduced state, to the step of treatment with an oxidising agent to produce a superficial oxidation, the particulate catalyst being maintained as a fluidized bed in either or both steps.

The following explanation of the behaviour of a bed of discrete particles of solid material, through which a gas is passed with increasing velocity, is given for the purpose of defining adequately the terms used in this specification.

When a stream of gas is passed in an upward direction through a bed of discrete particles, the pressure drop through the bed at first increases with increase in velocity of the gas. In this region of gas velocities, the gas exerts an upward frictional force on the particles. The upward frictional force exerted on the particles is, at all points, proportional to the pressure drop through the bed of particles. Hence the force exerted by each particle on the subjacent particles is progressively reduced, and the frictional force exerted by the particles on each other is progressively reduced. It will be understood that the maximum angle of repose of the bed of discrete particles is thereby also progressively reduced.

As the gas velocity is further increased a first critical value is reached, at which the whole weight of the particles is borne by the gas by virtue of the increased frictional force exerted by the gas on the particles. It will be understood therefore that the maximum angle of repose of the particles is reduced at this first critical value to zero.

As the velocity of the gas increases above this first critical value, the particles in the bed rearrange themselves to produce an increased voidage in the bed, while yet remaining in contact with one another. The increase in voidage has the effect of maintaining the frictional force of the gas on the particles constant and equal to the weight of the particles. The pressure drop across the bed also remains substantially constant for all gas velocities above the first critical value, but below the third critical value to be hereinafter defined. At this first point the bed of discrete particles assumes some of the properties of a liquid, for example the particles can be poured in a manner similar to liquid, and the bed can easily be stirred.

As the gas velocity is still further increased a second critical value is reached where the voidage in the bed has increased to such a value that the particles are substantially cushioned by the fluid and the bed assumes the appearance of a boiling liquid.

As the gas velocity is increased beyond the second critical value, the bed continues to expand until a third critical value is reached at which the gas velocity is substantially equal to the free falling speed of the particles in the gas being used and the particles are carried out of the vessel as a stream entrained in the gas.

In this specification a bed of particles through which the gas velocity is greater than the first critical value but less than the third critical value will be referred to as a fluidized bed. When the gas velocity through the bed is greater than the first critical value but less than the second critical value the bed will be referred to as a quiescent fluidized bed. A bed of particles through which the fluid velocity is greater than the second critical value but less than the third critical value will be referred to as a turbulent fluidized bed, while when the velocity of the gas is greater than the third critical value, so that the particles pass out of the vessel with the gas, the particles will be more particularly referred to as a dispersed suspension.

The particulate catalyst in either or both steps may be maintained as a quiescent fluidized bed, but it is preferable to maintain it as a turbulent fluidized bed. The production of a dispersed suspension is to be avoided.

In the reduction step the particulate catalyst may be maintained as a fluidized bed by the passage through it of an inert gas, such as nitrogen, to which a gaseous reducing agent is added, the quantity of reducing agent being varied according to the temperature desired in the reduction vessel, and the extent to which reduction has already taken place. Examples of suitable reducing agents are hydrogen, methanol and ethanol. When treating a batch of catalyst in the reduction step it is in general desirable, as reduction proceeds, to increase the proportion of reducing agent to maintain the temperature within desired limits until, even with a stream of undiluted reducing agent, there is no tendency for a rise in temperature to occur. It should be understood that the reduction step should not be carried out at temperatures which would tend to impair the activity of the final catalyst.

The particulate catalyst, after being treated with a gaseous reducing agent, preferably while maintained as a fluidized bed may, if desired, be subjected to superficial oxidation. An example of a suitable oxidising agent is oxygen, conveniently in the form of air. The superficial oxidation may be carried out by cautious treatment with an oxidising agent by any suitable means. It is preferable, however, to carry out the superficial oxidation while maintaining the reduced particulate catalyst in the fluidized state. The particulate catalyst may be maintained in the fluidized state by the passage through it of a stream of an inert gas, such as nitrogen, to which an oxidising agent such as oxygen or air, is added in suitable proportions. It is preferable to carry out the step of superficial oxidation at room temperature or temperatures not greatly in excess thereof. In general it is desirable to avoid carrying out the oxidation step at a temperature in excess of that at which the catalyst is to be used. The proportion of oxidising agent should be adjusted so that no undue rise in temperature occurs during the treatment, and preferably, in a batch process, the proportion of oxidising agent is gradually increased as the tendency for the temperature of the catalyst to rise decreases.

It should be understood that in this specification the terms "gaseous reducing agent" and "gaseous oxidising agent" refer to substances which are normally gaseous, and to substances which under the conditions of operation are in vapour form.

It should be understood that according to the present invention the step of superficial oxidation, while maintaining the reduced particulate catalyst in the fluidized state, may be applied to particulate catalysts which have been reduced by any suitable means. It is preferable, however, to carry out the steps of reduction and superficial oxidation while maintaining the particulate catalyst as to fluidized bed in both steps.

The steps of reduction and superficial oxidation of the particulate catalyst may be carried out in the same vessel, but as the reduction step will usually be carried out at elevated temperature and the superficial oxidation step at room temperature or thereabouts, it is preferable to carry out these steps in separate vessels. By suitable arrangement of separate vessels, means for transferring particulate catalyst from one vessel to the other, and means for controlling the temperature in the vessels, the production of reduced and stabilised catalyst can be carried out continuously.

*Example*

A particulate catalyst obtained by precipitating nickel carbonate on kieselguhr in quantities such that the reduced catalyst contained about 30% of nickel, was heated at a temperature within the range 400° C. to 450° C., while maintaining it as a turbulent fluidized bed by the passage through it, initially, of nitrogen to which hydrogen was subsequently added in increasing proportion, the linear velocity of the gas, whatever its composition, being maintained substantially constant at about 6 feet per second. The proportion of hydrogen in the gas used to maintain the turbulent fluidized bed was increased whenever the temperature of the bed tended to fall. After 50 minutes, when no tendency for a rise in temperature to occur was observed when the proportion of hydrogen was increased, the catalyst was allowed to cool while maintaining it as a turbulent fluidized bed by the passage through it of a stream of nitrogen. When the catalyst bed reached a temperature of about 50° C. air was added to the stream of nitrogen in gradually increasing proportion, ensuring that the temperature did not increase above about 60° C. Ultimately the stream of nitrogen was completely replaced by air and one hour after the complete replacement of the nitrogen by air, the catalyst had cooled to 20° C. The catalyst so prepared was stable when stored in air, and was a particularly active catalyst for the hydrogenation of furfural or furan at 120° C. and 30 atmospheres pressure of hydrogen.

While the process of the present invention has been described by reference to the preparation of a nickel-on-kieselguhr catalyst, it should be understood that it is applicable to the preparation of other catalysts in particulate form, such as cobalt-on-kieselguhr, and copper-on-silica gel catalysts.

We claim:

1. A process for the preparation of catalysts which comprises reducing a heavy metal compound of the group consisting of metal oxides, hydroxides and carbonates in particulate form with a mixture of hydrogen and an inert gas, after reduction cooling the reduced metal compound to a temperature below 60° C. by a stream of inert gas, and thereafter superficially oxidizing the reduced metal compound at a temperature below 60° C. by a mixture of oxygen and an inert gas, the mixture of hydrogen and inert gas during the reduction, inert gas during the cooling, and oxygen and inert gas during the oxidation supporting respectively the metal compound, reduced metal and oxidized metal in the fluidized state during the respective stages of preparation.

2. A process for the preparation of catalysts which is conducted in a series of steps involving reduction of a heavy metal compound of the group consisting of metal oxides, hydroxides and carbonates, cooling the reduced metal to a temperature below 60° C., and superficial oxidation of the resulting cooled metal, all of which steps are carried out with the substance being treated in the fluidized state, which state is maintained by the flow of an inert gas throughout all steps by the adjusted flow of hydrogen in the reduction step which prevents impairment of catalyst activity and the adjusted flow of oxygen in the oxidation step which avoids a rise in temperature above 60° C.

3. A process for the preparation of catalysts which comprises reducing a heavy metal compound of the group consisting of metal oxides, hydroxides and carbonates in particulate form with a mixture of hydrogen and an inert gas, adjusting the ratio of hydrogen to inert gas during the reduction to maintain the temperature below that which tends to impair the activity of the final catalyst, the hydrogen and inert gas supporting the compound and reduced metal in the fluidized state throughout the reduction, and superficially oxidizing in the fluidized state with a mixture of oxygen and an inert gas at a temperature below 60° C., the oxygen and inert gas supporting the inert metal in the fluidized state throughout the oxidation.

4. A process for the preparation of catalyst which comprises the steps of reducing with hydrogen a heavy metal compound reducible to its metallic state by hydrogen, cooling the reduced catalyst with a stream of inert gas, and subsequently superficially treating the cooled particulate catalyst with a gaseous oxidizing agent at a temperature below 60° C., the catalyst in the reducing step, the cooling step, and the oxidizing step being present as a particulate solid maintained as a turbulent fluidized bed.

JOHN GEORGE MACKAY BREMNER.
STANLEY BEAUMONT.

REFERENCES CITED

The following references are of record in the file of this patent:

UNITED STATES PATENTS

| Number | Name | Date |
| --- | --- | --- |
| 769,263 | Herman | Sept. 6, 1904 |
| 1,238,774 | Ittner | Sept. 4, 1917 |
| 1,268,692 | Dewar et al. | June 4, 1918 |
| 2,166,183 | Signaigo | July 18, 1939 |
| 2,225,487 | Roelen | Dec. 17, 1940 |
| 2,360,787 | Murphree et al. | Oct. 17, 1944 |
| 2,417,164 | Huber | Mar. 11, 1947 |
| 2,455,419 | Johnson | Dec. 7, 1948 |
| 2,495,497 | Ahlberg et al. | Jan. 24, 1950 |